United States Patent [19]
Taguchi et al.

[11] Patent Number: 5,513,997
[45] Date of Patent: May 7, 1996

[54] COUPLING EQUIPMENT FOR CONNECTORS

[75] Inventors: Naoto Taguchi; Akira Shinchi, both of Shizuoka, Japan

[73] Assignee: Yazaki Corporation, Tokyo, Japan

[21] Appl. No.: 206,036

[22] Filed: Mar. 3, 1994

Related U.S. Application Data

[63] Continuation of Ser. No. 16,727, Feb. 11, 1993, abandoned.

[30] Foreign Application Priority Data

Mar. 2, 1992 [JP] Japan .................................. 4-044631

[51] Int. Cl.⁶ .................................................. H01R 13/62
[52] U.S. Cl. ............................................ 439/157; 439/155
[58] Field of Search ..................................... 439/152–160, 439/372, 352, 353

[56] References Cited

U.S. PATENT DOCUMENTS

| | | | |
|---|---|---|---|
| 2,987,693 | 6/1961 | Wamsley | 439/157 |
| 5,135,410 | 8/1992 | Kawase et al. | 439/157 |
| 5,174,785 | 12/1992 | Endo et al. | 439/489 |
| 5,201,665 | 4/1993 | McCardell, Jr. et al. | 439/157 |

FOREIGN PATENT DOCUMENTS 52-133993 10/1977 Japan .
2-56875 2/1990 Japan .

*Primary Examiner*—David L. Pirlot
*Attorney, Agent, or Firm*—Young & Basile

[57] ABSTRACT

The object of the present invention is to provide a coupling equipment for connecting a pair of connectors which is capable of performing a perfect and sure coupling of the connectors by using a tow-step locking structure with a substantially low insertion force, yet capable of actively eliminating an imperfect preliminary connection of the connectors. In order to achieve the above object, the coupling equipment of the present invention is constructed such that the first connector comprises: a bifurcated operation lever having a pair of activating arms at the opposite side ends thereof and pivotably supported by a supporting shaft, each of the activating arms being formed with a guide groove at the inner surface side of the front end portion thereof, whereas the second connector comprises a slide pin to be inserted and guided into the guide groove, wherein the operation lever of the first connector is further formed either with an expanded portion for eliminating the imperfectly inserted slide pin, or with an abutting face to abut with the slide pin for prohibiting the rotation of the operation lever when the preliminary connection is not perfectly achieved, or further formed with another expanded portion for prohibiting the further insertion of the operation lever when the operation lever is already set in the main locked position thereof.

11 Claims, 6 Drawing Sheets

COUPLING EQUIPMENT FOR CONNECTORS

This is a continuation of application Ser. No. 08/016,727 filed on Feb. 11, 1993, now abandoned.

BACKGROUND OF THE INVENTION

1. Field of the Invention

The present invention mainly relates to a coupling equipment for connecting connectors of wire-harnesses adopted in automotive vehicles.

2. Description of the Prior Art

There has been proposed a conventional coupling device for connecting connectors used in vehicles or the like so far, a case in point being the one disclosed in the Japanese Utility Model Laid-open No.52-133993 as shown in FIG. 9. In the figure, reference character a denotes a male connector, and reference character b denotes a female connector, wherein each of the connectors accommodates a plurality of terminal metals therein, so that the terminal metals of the respective connectors can be connected upon mutual engagement of the male and female connectors.

In the same Figure, a fitting operation lever c is pivotably supported by a supporting shaft d on the external surface of the male connector a, which operation lever comprising a guide groove c1 at the front end portion thereof, and an operation rod c2 at the rear end portion thereof, wherein at the far end of the operation rod c2, a main locking projection e is further provided. When the operation lever c completes a coupling operation of the connectors, the locking projection e is firmly engaged with a main engaging piece f. As for the female connector b, a slide pin q is protrudingly disposed on the external surface thereof in such a location that it directly faces against the operation lever c so as to be guided into the guide groove c1 of thereof.

In this construction above, the terminal metals accommodated in the respective male connector a and the female connector b are immediately put in a slightly fitted state therebetween, and if the operation lever c is rotated in this state, the guide groove c1 is engaged with the slide pin q and the guide groove c1 draws the slide pin toward itself as the rotation advances, whereby the respective male and female connectors a and b are engaged with each other, and this engaged state is maintained when the fitting operation of the two connectors is completed and the main locking projection e is engaged with the main engaging piece f as shown in FIG. 10.

However, the above construction contains such a defect that in the above slightly fitted state merely by way of the terminal metals of the respective connectors, the male connector a easily comes off even with a light tension applied to the connecting cable, and thus the male connector a gets unhinged and broken even before the coupling operation is conducted by the operation lever c.

SUMMARY OF THE INVENTION

The present invention has been made to eliminate such problems as described above, and it is an object of the present invention to provide a coupling equipment for connectors which is capable of firmly connecting a pair of connectors by use of an operation lever only after performing a perfect preliminary connection therebetween, wherein if the preliminary connection is not perfectly accomplished, either the rotation of the operation lever is hampered, or an imperfect preliminary connection of the connectors is rejected.

In order to achieve the above object, a coupling equipment for connectors according to the present invention is constructed such that the first connector comprises: a bifurcated operation lever having a pair of activating arms at the opposite side ends thereof and pivotably supported by a supporting shaft, each of the activating arms being formed with a guide groove at the inner surface side of the front end portion thereof, and the second connector comprises: a slide pin to be inserted and guided into the guide groove, characterized in that the operation lever of the first connector is further formed either with an expanded portion for rejecting the slide pin when the preliminary connection is not perfectly accomplished, or formed with an abutting face to abut with the slide pin for prohibiting the rotation of the operation lever when the preliminary connection is not perfectly accomplished, or further formed with an expanded portion for prohibiting the further insertion of the operation lever when the operation lever is already set in the main locked position thereof.

Other objects and features of the invention will be more fully understood from the following detailed description and appended claims when taken in conjunction with the accompanying drawings.

Figure 1:
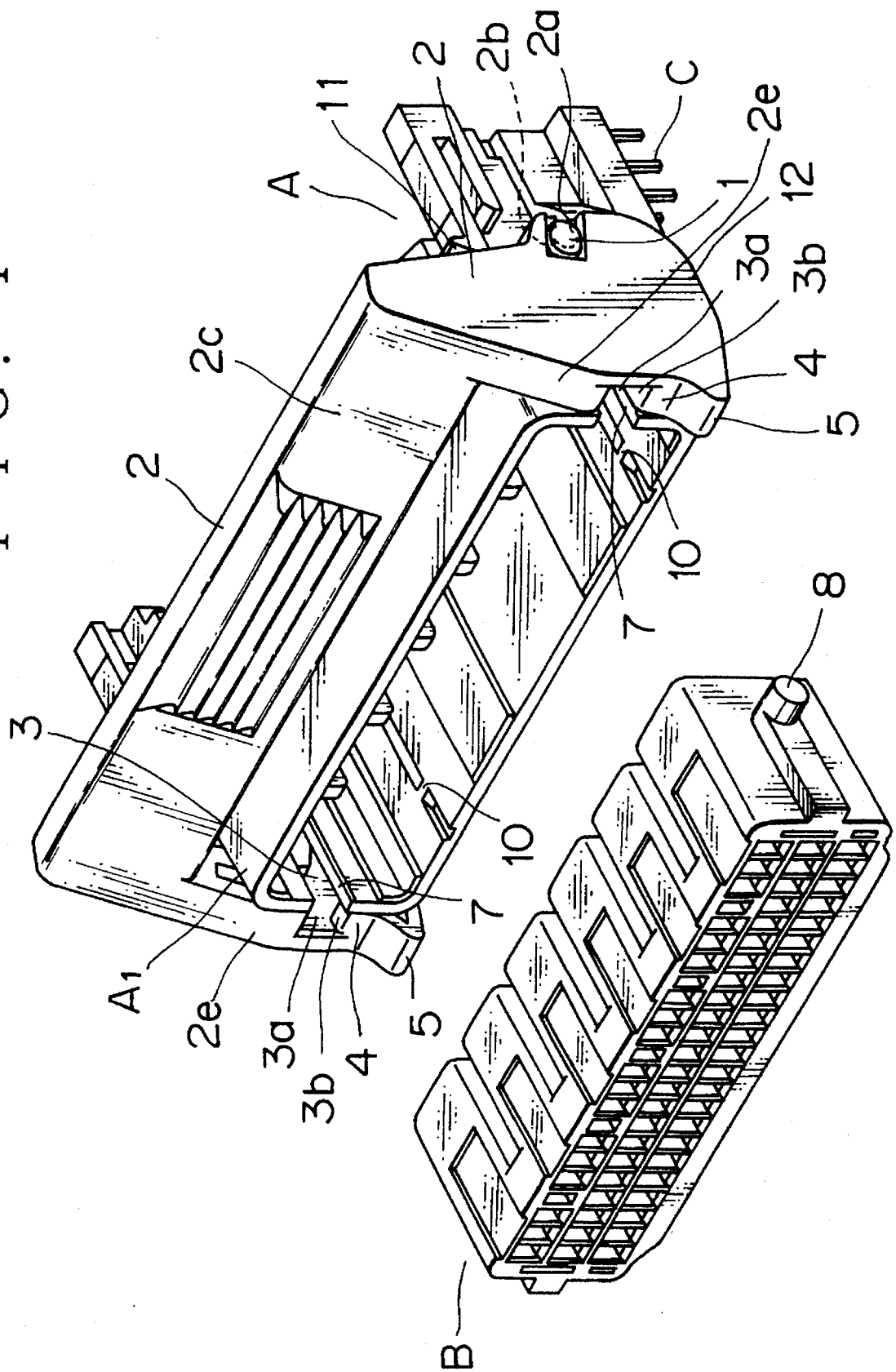
FIG. 1 is a perspective view of a pair of connectors according to the present invention, showing the state thereof in which they are detached from each other.

In the drawings, reference characters A and B respectively denote a pair of connectors, reference characters C and D denote respectively a plurality of terminal metals, reference numeral 2 denotes an operation lever, numeral 3 denotes a guide groove, whereas 3b denotes an abutting surface, 5 an expanded portion for preventing an imperfect connection, 8 a slide pin, and reference numeral 12 denotes an expanded portion for preventing the further insertion of the slide pin 8.

DETAILED DESCRIPTION OF THE PREFERRED EMBODIMENTS

In the following, one embodiment of the present invention is described with reference to the FIGS. 1 to 8.

Figure 3:
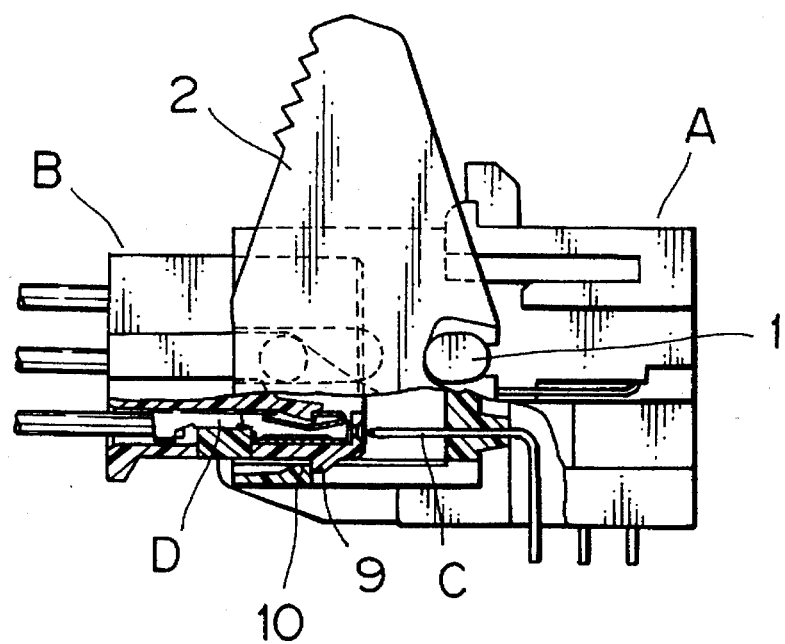
FIG. 3 is a sectional view of the connectors shown in FIG. 2.

In FIG. 1, reference character A denotes a female connector and B denotes a male connector respectively containing a plurality of terminal metals therein as shown in FIG. 3. A supporting shaft 1 is protrudingly provided at the opposite walls of a hood A1 of the female connector A, whereby an operation lever 2 is pivotably provided by engaging a locking hole 2b thereof with the supporting shaft 1 by way of a narrow groove portion 2a. The operation lever is constructed so-called as a bifurcated state such that the pair of opposite activating sections 2e, 2e are connected by a handling section 2c, and each of the activating sections 2e is formed with a guide groove 3 at the inner surface side of the front end portion thereof. It is to be noted that the guide groove 3 is further formed with an abutting surface 3b at one end portion of an entrance 3a thereof, while on the front external surface of each of the activating sections 2e of the operation lever 2, a flat surface 4 and an expanded portion 5 for avoiding an imperfect connection by eliminating the insertion of the other connector B are arranged in succession to the entrance 3a of the abutting surface 3b side thereof. Further, a balance keeping spring 6 is woundly applied to the supporting shaft 1, wherein one coil end 6a is engaged with the female connector A, while the other end 6b is engaged with the operation lever 2, so that the operation lever 2 is maintained to be upright, and the entrance 3a of the guide groove 3 coincides with a guide rail 7 for receiving a slide pin 8 of the other connector B, which guide rail 7 is formed successively from the front end portion of the hood A1. As for the connector B, the slide pin 8 is provided at the opposite side ends thereof, and also a projection 9 for the preliminary engagement is provided protrudingly from the bottom surface of the male connector B, which projection 9 is to be engaged with a stepped portion 10 provided at the bottom surface of the hood A1 of the female connector A as shown in FIG. 3.

Figure 2:
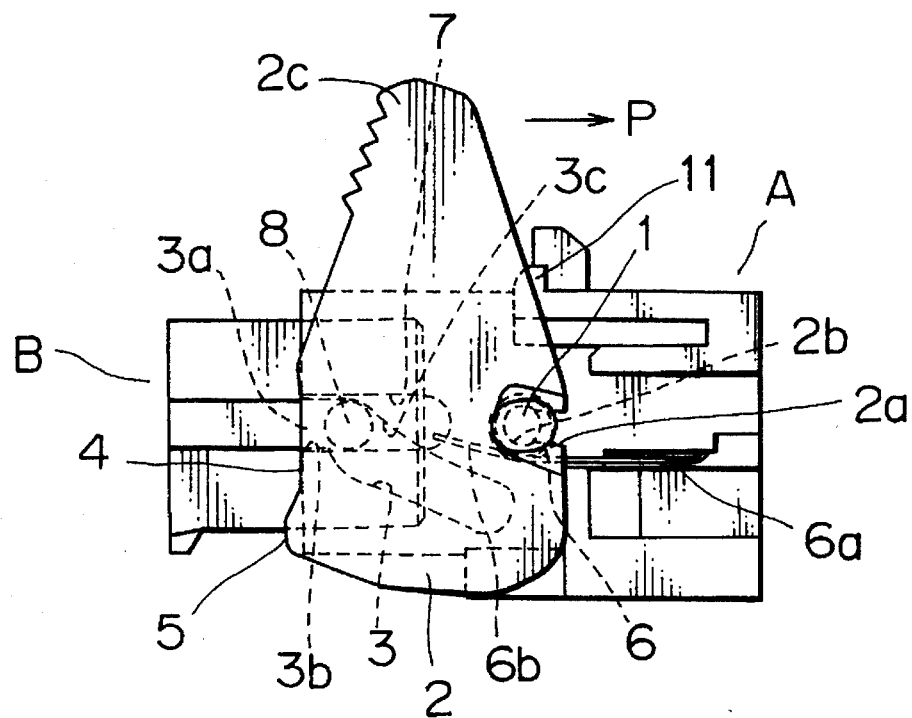
FIG. 2 is a side view of the above connectors in a preliminary connected state.
Figure 4:
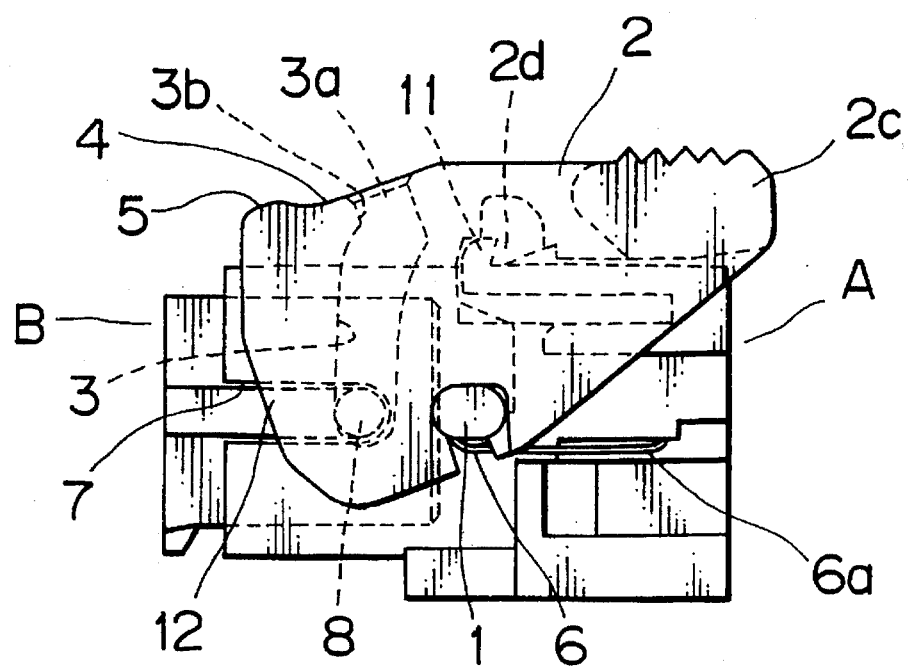
FIG. 4 is a side view of the connectors in a perfectly connected state.

When these connectors A and B are to be engaged with each other, the slide pin 8 of the male connector B first advances along the guide rail 7 of the hood A1 and the guide groove 3 of the female connector A until it abuts with the slanting portion 3c of the guide groove 3 as shown in FIG. 2. In this state, the projection 9 for the preliminary engagement is engaged with the stepped portion 10 inside the main body A1, but the terminal metals C and D are maintained in a state that they are not contacted with each other as shown in FIG. 3. Thereafter, when the operation lever 2 is rotated in the direction indicated by P at this stage, the guide groove 3 draws the male connector B by way of the slide pin 8, thereby completely coupling the male and female connectors A and B with a substantially low inserting force and connect the terminal metals C and D, and finally the engaging portion 2d of the operation lever 2 is engaged with a locking projection 11 for a perfect engagement as shown in FIG. 4.

Figure 5:
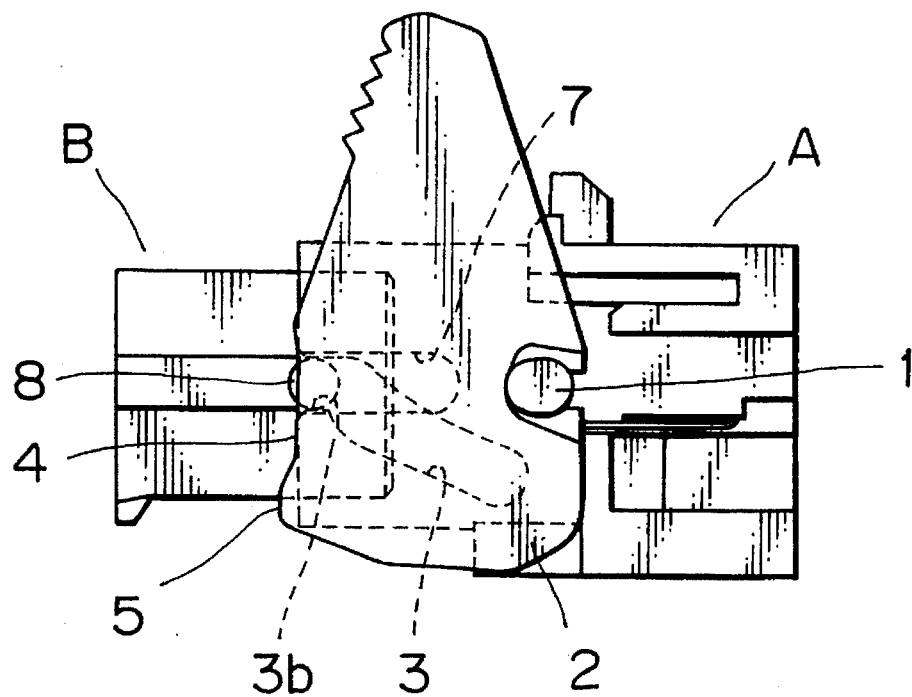
FIG. 5 is a side view of the connectors, showing the state that the preliminary connection of the connectors is not perfectly accomplished.
Figure 6:
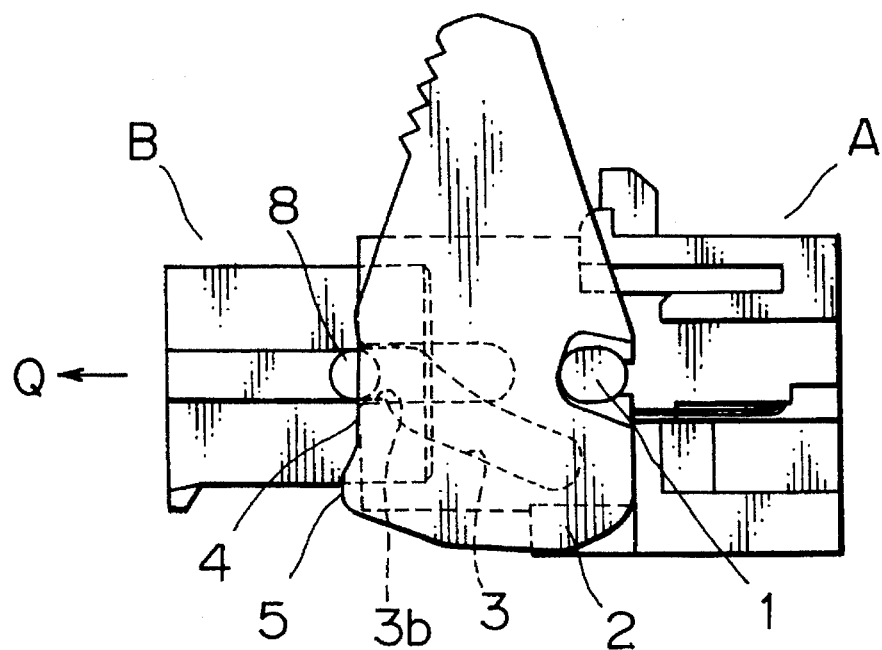
FIG. 6 is a side view of the connectors, showing the state that the connectors have not reached even to the imperfect preliminary connection thereof shown in FIG. 5.
Figure 7:
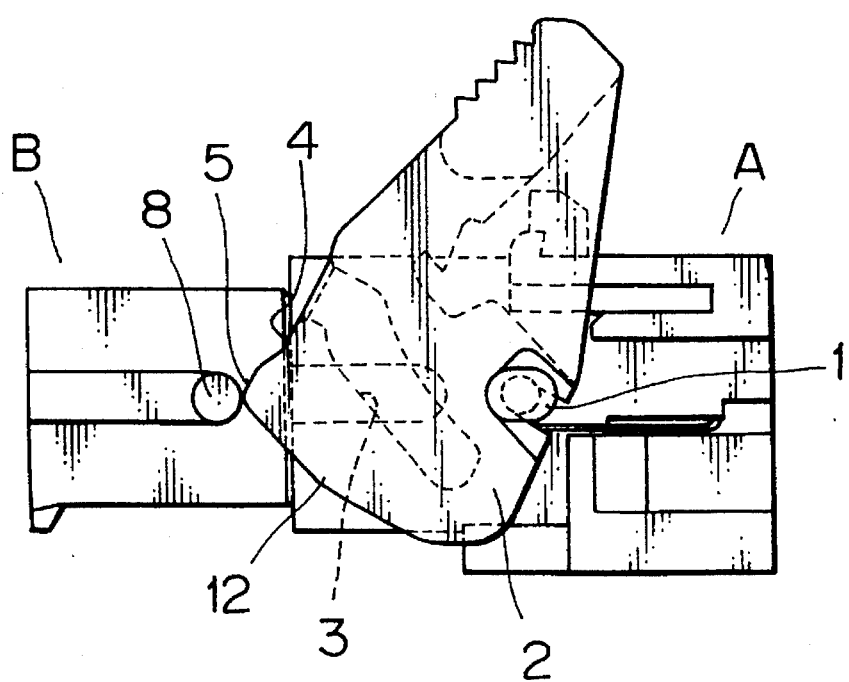
FIG. 7 is a side view showing the state that the imperfect preliminary connection of FIG. 6 is rejected.

It is to be noted that if the operation lever 2 is rotated in the state that the preliminary connection of the connectors is not perfectly accomplished, the abutting surface 3b formed at the entrance of the guide groove 3 is abutted to the slide pin 8, and thus the rotation of the lever 2 is hampered as shown in FIG. 5. Further, when the connection between the male and female connectors A and B is even before reaching the state of FIG. 5 as shown in FIG. 6, the flat portion 4 escapes from the slide pin 8 and thus the rotation of the lever 2 is, on the contrary, enabled, whereby the expanded portion 5 for eliminating an imperfect connection shifts the male connector B toward the direction Q by way of the slide pin 8 to detach it from the female connector A as shown in FIG. 7.

Figure 8:
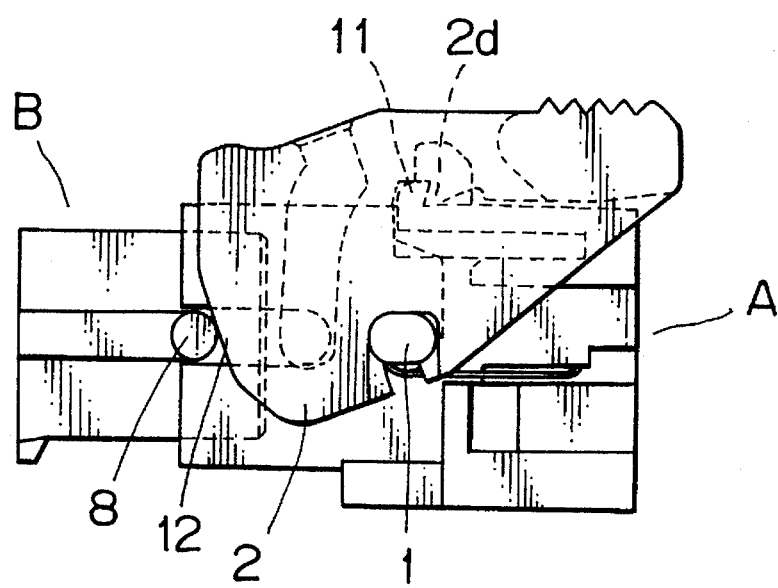
FIG. 8 is a side view in which the operation lever hampers the further insertion of the other connector.
Figure 9:
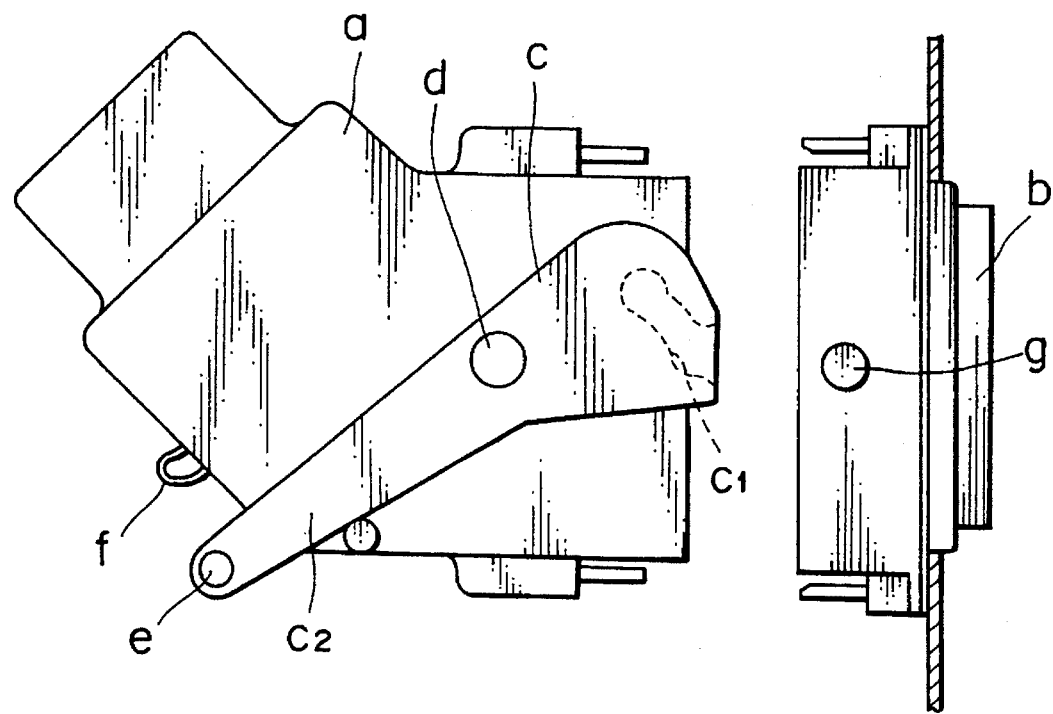
FIG. 9 is a side view of a conventional coupling equipment for connectors wherein a pair of connectors are in a disconnected state; and, FIG. 10 is a side view showing a perfectly connected state of the connectors shown in FIG. 9.
Figure 10:
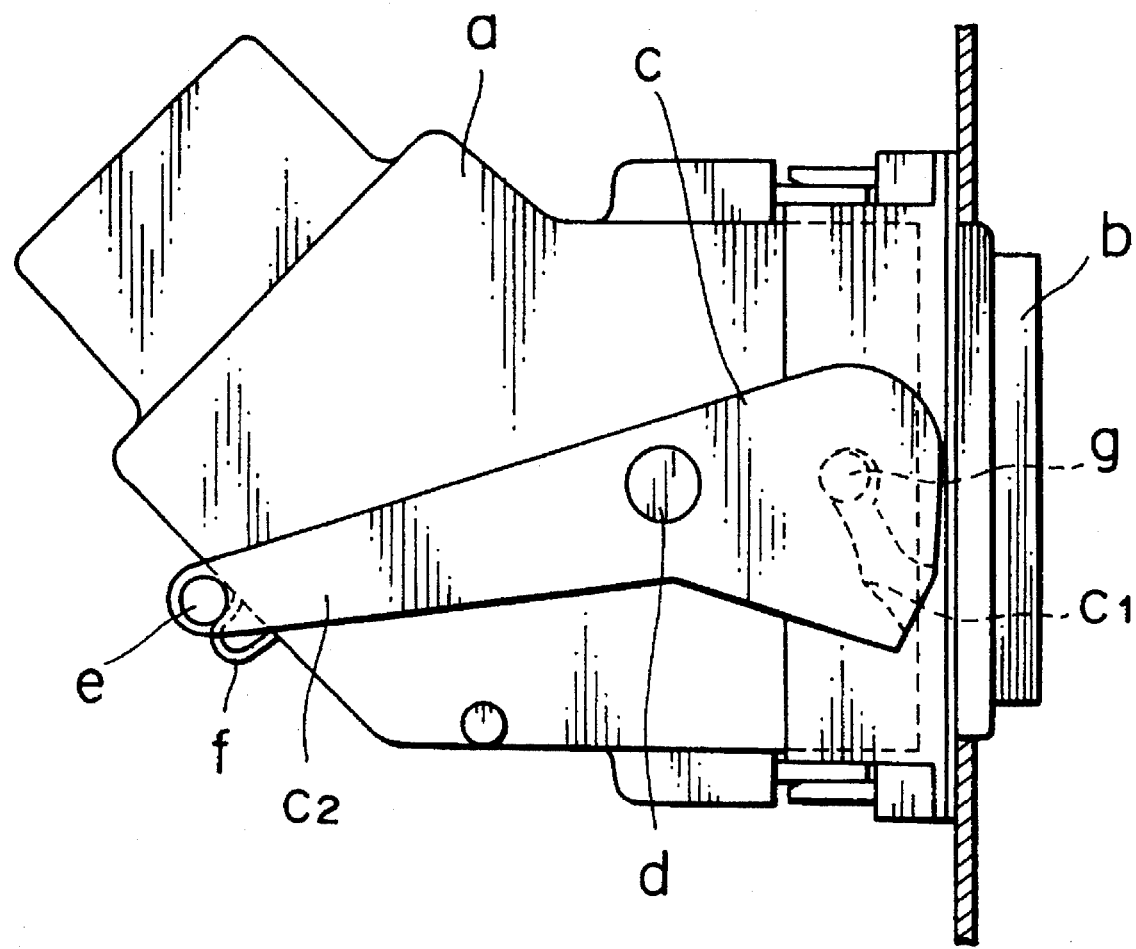

In FIG. 8, it is shown that the male connector B is mistakenly inserted into the female connector A despite the situation that the operation lever 2 is already rotated and locked at its perfect engagement location, wherein an expanded portion 12 for prohibiting the preliminary connection formed at the bottom portion of the operation lever 2 hampers the further insertion of the connector B and thus the connection of the connectors is prohibited.

Operation

Since the present invention is constructed as such, a falling off of the connectors before the perfect main connection can be avoided due to a preliminary locking structure, and in case a preliminary connection between the connectors is not perfectly accomplished, the rotation of the operation lever is prohibited, or an imperfect preliminary connection can be actively eliminated.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A coupling mechanism for interlocking a male connector which has been inserted into a female connector comprising:

a female connector element comprising a housing having opposite side ends and a front opening which defines a connector insertion direction; each side including a guide slot which opens to said front opening;

an operating lever having opposite side ends and being pivotally attached to the opposite side ends of the female connector element, the operating lever being rotatable about a pivot axis which is substantially perpendicular to the insertion direction between an open position and a locked position;

the operating lever including a cam groove in each side end which aligns with and is coextensive with the adjacent guide slot in the female connector element when the operating lever is in the open position and which assumes an angularly intersecting relationship with the adjacent guide slot when the lever is rotated to the locked position, said cam groove having a length and a height, the cam groove length being substantially greater than the cam groove height, said operating lever rotates toward said female connector element when rotated from said open position to said locked position;

a male connector element which fits into the receptacle of the female connector element and which has opposite side ends;

a slide pin extending outwardly from each side end of the male connector element; the slide pins being slidable into the coextensive guide slots and grooves when the operating lever is in the open position; and the pivot axis of the lever being spaced from the guide slot; said lever providing a pair of peripheral cam surfaces, each having a substantially arcuate shape and contiguous with said groove openings, said arcuate cam surfaces spaced from said pivot axis and operative, when said lever is rotated from said open position to said locked position, to apply a force to the slide pins when only partially inserted into said grooves tending to urge said slide pins and said male connector out of said receptacle.

2. The coupling mechanism as claimed in claim 1 wherein the male connector element further comprises a preliminary engagement projection extending from the bottom thereof; and the female connector element further comprises a stepped portion for receiving and engaging with the preliminary engagement projection.

3. The coupling mechanism as claimed in claim 1 wherein the female connector element further comprises a spring for maintaining the operating lever in the open position; a first end of the spring is engaged with the operating lever; and a second end of the spring is engaged with the female connector element.

4. The coupling mechanism as claimed in claim 1 wherein a pair of arcuate surfaces extend from said operating lever into said cam groove, said abutting surfaces contiguous with said groove openings.

5. The coupling mechanism as claimed in claim 1 further comprising a means for securing the operating lever in the locked position.

6. The coupling mechanism as claimed in claim 5 wherein the means for securing the operating lever comprises a locking arm on the female connector element; and a recessed portion in the operating lever engageable with the locking arm.

7. A coupling mechanism for interlocking a male connector which has been inserted into a female connector comprising:

a female connector element comprising a housing having opposite side ends and a front opening which defines a connector insertion direction; each side including a guide slot which opens to said front opening;

an operating lever having opposite side ends and being pivotally attached to the opposite side ends of the female connector element, the operating lever being rotatable about a pivot axis which is substantially perpendicular to the insertion direction between an open position and a locked position, said cam groove having a length and a height, the cam groove length being substantially greater than the cam groove height, said operating lever rotates toward said female connector element when rotated from said open position to said locked position;

the operating lever including a cam groove in each side end which aligns with and is coextensive with the adjacent guide slot in the female connector element when the operating lever is in the open position and which assumes an angularly intersecting relationship with the adjacent guide slot when the lever is rotated to the locked position;

a male connector element which fits into the receptacle of the female connector element and which has opposite side ends;

a slide pin extending outwardly from each side end of the male connector element; the slide pins being slidable into the coextensive guide slots and grooves when the operating lever is in the open position; and the pivot axis of the lever being spaced from the guide slots whereby the cam groove;
   (a) prevents rotation of the lever if the slide pins of the male connector element are inserted to a first partial extent, and
   (b) allows rotation of the lever and applies an insertion force to the male connector element tending to draw the male connector element into the receptacle if inserted to a second partial extent which is greater than the first extent;

said lever further comprising a pair of peripheral cam surfaces, each having a substantially arcuate shape and contiguous with said groove openings, said arcuate cam surfaces operative, when said lever is rotated, to apply a force to the slide pins of the male element tending to displace the male element out of the receptacle when inserted into said groove openings to an extent lesser than said first extent.

8. The coupling mechanism as claimed in claim 7 wherein the female connector element further comprises a spring for maintaining the operating lever in the open position; a first end of the spring is engaged with the female connector element.

9. The coupling mechanism as claimed in claim 7 wherein a pair of arcuate surfaces extend from said operating lever into said cam groove, said abutting surfaces contiguous with said groove openings.

10. The coupling mechanism as claimed in claim 7 further comprising a means for securing the operating lever in the locked position.

11. The coupling mechanism as claimed in claim 10 wherein the means for securing the operating lever comprises a locking arm on the female connector element; and a recessed portion in the operating lever engageable with the locking arm.

* * * * *